(12) United States Patent
Dreher et al.

(10) Patent No.: US 6,656,994 B1
(45) Date of Patent: Dec. 2, 2003

(54) USE OF POLYSULFIDE-FREE PREPARATIONS AS AN ADDITIVE FOR LOAM OR CLAY-BASED CONSTRUCTION MATERIALS

(75) Inventors: Stefan Dreher, Neustadt (DE); Joachim Roser, Brüssel (DE); Joachim Pakusch, Speyer (DE); Dietbert Knöfel, Siegen (DE); Karl-Georg Boettger, Siegen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/926,480

(22) PCT Filed: May 10, 2000

(86) PCT No.: PCT/EP00/04249
§ 371 (c)(1), (2), (4) Date: Nov. 9, 2001

(87) PCT Pub. No.: WO00/68162
PCT Pub. Date: Nov. 16, 2000

(30) Foreign Application Priority Data

May 11, 1999 (DE) .......................................... 199 21 815

(51) Int. Cl.$^7$ ................................................. C08K 3/34
(52) U.S. Cl. ...................... 524/445; 523/130; 523/131; 523/132
(58) Field of Search ................................. 523/130, 131, 523/132; 524/445, 446, 447

(56) References Cited

U.S. PATENT DOCUMENTS

| 4,243,563 | A | 1/1981 | Ferm |
| 5,516,830 | A | 5/1996 | Nachtman et al. |
| 5,863,975 | A | 1/1999 | Whitton et al. |

OTHER PUBLICATIONS

Chemical Abstract, JP 56–050156, May 7, 1981.
Chemical Abstract, DE 41 32 009, May 6, 1993.
Chemical Abstract, DE 195 42 676, May 22, 1997.
Chemical Abstract, JP 49–099719, Sep. 20, 1974.
Chemical Abstract, JP 58–190864, Nov. 7, 1983.
Chemical Abstract, JP 49–099781, Sep. 9, 1974.
Chemical Abstract, JP 48–43051, Jun. 22, 1973.

*Primary Examiner*—Edward J. Cain
*Assistant Examiner*—Katarzyna Wyrozebski Lee
(74) *Attorney, Agent, or Firm*—Oblon, Spivak, McClelland, Maier & Neustadt, P.C.

(57) ABSTRACT

The use is described of polysulfide-free preparations comprising, based on solids content, from 40 to 99.5% by weight of at least one water-dispersible copolymer and from 0.5 to 10% by weight of at least one alkoxylated ionic or nonionic emulsifier, as additives for construction materials based on loam or clay. The building materials based on loam or clay and comprising the preparation are described, as are the use of the construction materials and a process for treating construction materials with the preparation.

10 Claims, No Drawings

USE OF POLYSULFIDE-FREE PREPARATIONS AS AN ADDITIVE FOR LOAM OR CLAY-BASED CONSTRUCTION MATERIALS

This application is a 371 of PCT/EP 00/04249, filed May 10, 2000, which claims priority to DE 199 21 815.3 filed on May 11, 1999.

The present invention relates to the use of polysulfide-free preparations comprising at least one water-dispersible copolymer and at least one alkoxylated ionic or nonionic emulsifier, as an additive for construction materials based on loam or clay.

The ready availability and ease of handling of loam and clay have led to their use over many centuries as materials for constructing and decorating buildings, e.g. for producing unburnt loam or clay bricks or tiles, for filling the spaces between the timbers in half-timbered or timber-frame buildings, as renders or mortars, or as filling materials in ceilings or walls. Numerous monographs describe the various techniques relevant for this, for example rammed-earth construction, the production of loam bricks and the processes of loam extrusion and molding. In order to modify the properties of construction materials made from loam or clay, e.g. to improve strength and/or thermal insulation, there are known additives made-from organic materials, such as straw, comminuted wood, shavings, ground cork and/or cellulose, or from inorganic materials, e.g. expanded:slate or shell limestone.

The fact that construction materials of this type made from loam or clay are now of no importance in industrial countries is primarily due to their low compressive strength and low water resistance and to the high degree of shrinkage when construction materials made from loam or clay undergo the required drying. Added to this is the long drying time for these construction materials, since the setting process is essentially physical drying and in most cases takes from 1 to 3 weeks.

A wide variety of possible additives intended to overcome or mitigate these disadvantages is known from the literature, for example, DE-A-41 32 009 formulates a quick-setting mortar mixture based on loam and comprising, in addition to conventional filling materials, a hardener (cement) and also a setting accelerator (gypsum). DE-A-195 42 676 discloses a rapid-hardening mortar mixture based on loam with other .constituents which are cement, a plasticizer and filling materials (expanded clay, perlite, and the like).

Adding cement to construction materials made from loam or clay is frequently problematic-since the two materials differ greatly in their shrinkage behavior during the setting process, and this leads to cracking and therefore severe impairment of mechanical strength. The tendency to cracking can be ameliorated by very slow drying under constant-humidity conditions, further extending setting times.

Addition of organic monomers and/or polymers can also contribute to improving the properties of construction materials with mineral and/or oxidic constituents. For example, JP-A-49099719 describes a construction material based on red loam, an oxidic waste produced in large quantities during the production of aluminum by the BAYER process. This red loam is mixed with cement, sand and from 0.5 to 2% by weight of polymer dispersion and, if desired, water. The example uses 2% by weight of a 40% strength polyvinyl acetate dispersion, based on the total of red loam and cement.

JP-A-58190864 describes colored coating compositions for road construction made from red loam with synthetic resins and aggregates. A synthetic resin which may be used is a 30–80% strength by weight emulsion comprising one or more polymers, such as polyvinyl acetate, polyvinyl acetate-ethylene, polyvinyl acetate-DAAM, polyolefins, polyvinyl chloride and/or epoxy resins. JP-A-49099781 also describes construction materials based on red loam. Here, the red loam is mixed with reinforcing agents or polymer dispersions, molded and dried at 100° C. The resultant construction materials are then degassed under high vacuum, saturated with monomers, e.g. methyl methacrylate containing about 1% by weight of benzoyl peroxide and 1% by weight of silane and then hardened by immersion into hot water. In JP-A-4843051 mixtures of loam with blowing agents, sodium silicate, dolomite, gypsum, perlite and water-repellent silicones with an ethylene-vinyl acetate copolymer emulsion, poly(alkylene oxide) and with an aromatic diisocyanate are prepared, dried using hot air and a microwave dryer and press-molded while hot to give flame-retardant boards of construction material.

U.S. Pat. No. 4,243,563 discloses aqueous compositions comprising calcium polysulfide and to be used for ground stabilization and ground reinforcement. Besides the calcium polysulfide, which is intended to have a reinforcing effect, the compositions comprise a sufficient amount of an emulsifier which is compatible with the calcium polysulfide and facilitates; the penetration of the calcium sulfide into the ground, and a dispersed organic polymer with an average molecular weight of from 5000 to 600,000. The. examples use exclusively vinyl acetate copolymers. The compositions are primarily used for impregnating or saturating ground and construction works, and also for mixing with excavated material, and the mixtures are used, for example, for constructing dams or for producing building blocks for adobe buildings. Any emulsifier is suitable for these compositions as long as it is compatible with the calcium polysulfide, i.e. does not cause this to coagulate.

JP-A-5650156 discloses a process for improving the properties of loamy earth as a construction material by adding from 5 to 40% by weight of an ethylene-vinyl acetate copolymer emulsion with an ethylene content of from 5 to 30% by weight. The ethylene-vinyl acetate copolymer emulsion is prepared by emulsion polymerization under pressure in the presence of a suitable emulsifier and protective colloid. Comparative experiments compared the resultant emulsion with a naturally occurring latex and with an acrylic-based emulsion. To this end all of the dispersions were used to produce sample loam blocks with dispersion contents of from 5 to 20%. The latex and the acrylic-based emulsion proved unsuitable in the comparative experiments, firstly due to insufficient stability of the samples prepared using these comparative emulsions, since in some cases the load-bearing capacity of these samples was less than 50% of that of samples produced using ethylene-vinyl acetate emulsions, and secondly due to the unpleasant odor observed from these samples with the comparative emulsions. In comparison with the use of untreated loam a disadvantage of this process is that the ethylene-vinyl acetate copolymer emulsions are detrimental to ease of use, i.e. the adjustment of the consistency of the loam/emulsion mixture and its subsequent handling, e.g. the conveying and molding of the mixture. In addition, some of the construction materials prepared by this process have an even higher degree of shrinkage than pure loam during setting.

It is an object of the present invention to provide an additive which improves the mechanical strength and the water resistance of construction materials based on loam or clay and which is easy to use, i.e. easy to incorporate into the construction materials, and has good properties during the further handling of the construction materials, and does not require additional hardening steps, such as heating, irradiation, etc. The undesirable shrinkage during setting, as typically found when using construction materials based on loam or clay, should be reduced.

We have found that this object is achieved, surprisingly, by an additive for construction materials, in particular for unburnt construction materials based on loam or clay, which overcomes the disadvantages of the prior art, gives the construction materials high mechanical strength and water resistance and provides ease of use. Constituents present in the additive are a water-dispersible copolymer and from 0.5 to 10% by weight of at least one alkoxylated ionic or nonionic emulsifier.

The present invention therefore provides the use, as an additive for construction materials based on loam or clay, of polysulfide-free preparations comprising, based on solids content, from 40 to 99.5% by weight of at least one water-dispersible copolymer and from 0.5 to 10% by weight of at least one alkoxylated ionic or nonionic emulsifier.

It was particularly surprising that the advantageous properties which the preparations according to the invention give to the construction materials based on loam or clay showed only slight dependence on the chemical structure of the monomers used to prepare the copolymers.

Within the mineral content of the building materials based on loam or clay there is preferably at least 10% by weight, in particular at least 20% by weight and with preference for at least 30% by weight, of loam or clay.

All the quantities are based on the solids content of loam or clay. The solids content of loam or clay is determined by drying at 120° C. for 24 hours. For the purposes of the present invention, the mineral content is the dry solids of the construction materials without any added porous substances.

All of the quantities relating to the preparation used according to the invention and its constituents, in particular the copolymer, the emulsifier and the plasticizer, are calculated as solid unless otherwise stated.

The solids contents of the preparations and constituents of the preparations are determined by drying to constant weight at 120° C.

The copolymers used are known and commercially available or capable of preparation by known methods.

The copolymers may be prepared by any type of free-radical copolymerization of ethylenically unsaturated monomers, e.g. by solution, precipitation, bulk, emulsion or suspension polymerization. The copolymers are preferably prepared by free-radical aqueous emulsion polymerization in the presence of at least one free-radical polymerization initiator and, if desired, of one or more surface-active substances. The water-dispersible copolymer is preferably in the form of polymer particles with an average particle size of from 50 to 1000 nm, in particular from 50 to 500 nm, particularly preferably from 60 to 250 nm. Processes for adjusting the polymer particle size are disclosed, for example, in EP-A-126699, EP-A-567 881, EP-A-567 819, DE-A-31 47 008 and DE-A-42 13 967.

The aqueous emulsion polymerization may be carried out in a conventional manner, e.g. as described in "Encyclopedia of Polymer Science and Technology", Vol. 5, Wiley & Sons Inc., NY 1966, p. 847). Water-dispersible copolymers may also be used in the form of particles involving more than one phase. They may be prepared, for example, by sequential processes as described, for example, in EP-555959, EP-308753 and EP-654454.

The polymerization is carried out in a conventional manner in the presence of free-radical-generating compounds (initiators). The amount of these compounds required is preferably from 0.05 to 10% by weight, particularly preferably from 0.2 to 5% by weight, based on the monomers used in the polymerization.

It is also possible to use relatively high-molecular-weight copolymers which have been polymerized in the presence of conventional crosslinking agents. Suitable crosslinking agents are known to the skilled worker, e.g. from DE 197 29 161.9, the full scope of which is incorporated herein by way of reference.

The preparations used according to the invention may be in any desired form, e.g. as solid, aqueous dispersion or any other solvent-containing or solvent-free form. The preparations according to the invention are preferably used as aqueous dispersions, in particular low-solvent or solvent-free aqueous dispersions, or as a solid, e.g. as a powder or pellets.

The water-dispersible copolymers generally contain at least two different-polymerized monomers. Suitable monomers are generally those selected from the class consisting of vinylaromatic monomers, such as styrene, α-methylstyrene, o-chlorostyrene or vinyltoluenes, esters of ethylenicdlly unsaturated $C_3$–$C_8$ mono- or $C_4$–$C_8$ dicarboxylic acids with $C_1$–$C_{18}$ alkanols, preferably $C_1$–$C_{12}$ alkanols and in particular $C_1$–$C_8$ alkanols or $C_5$–$C_8$ cycloalkanols. Examples of suitable $C_1$–$C_{18}$ alkanols are methanol, ethanol, n-propanol, isopropanol, 1-butanol, 2-butanol, isobutanol, tert-butanol, n-hexanol, 2-ethylhexanol, lauryl alcohol and stearyl alcohol. Examples of suitable cycloalkanols are cyclopentanol and cyclohexanol. Particularly suitable compounds are esters of acrylic acid, of methacrylic acid, of crotonic acid, of maleic acid, of itaconic acid, of citraconic acid, or of fumaric acid, and specifically esters of acrylic acid and/or of methacrylic acid, for example methyl (meth)acrylate, ethyl (meth)acrylate, isopropyl (meth)acrylate, n-butyl (meth)acrylate, isobutyl (meth)acrylate, n-hexyl (meth)acrylate, tert-butyl (meth)acrylate or 2-ethylhexyl (meth)acrylate, or else of esters of fumaric acid or of maleic acid, e.g. dimethyl fumarate, dimethyl inaleate or di-n-butyl maleate. Nitriles of α,β-monoethylenically unsaturated $C_3$–$C_8$ carboxylic acids may also be used, for example acrylonitrile or methacrylonitrile. Other monomers which may be used are conjugated $C_4$–$C_8$ dienes, such as 1,3-butadiene, isoprene or chloroprene, or vinyl chloride or vinylidene chloride. Other suitable monomers are the ethers of vinyl or allyl alcohol with $C_1$–$C_{40}$ alkanols, and these may have one, two or more substituents selected, independently of one another, from the class consisting of hydroxyl groups, $C_1$–$C_{12}$-alkoxy groups, amino groups, $C_1$–$C_{12}$-alkylamino groups and di-$C_1$–$C_{12}$-alkylamino groups, for example methyl vinyl ether, ethyl vinyl ether, propyl vinyl ether or 2-ethylhexyl vinyl ether, the allyl esters of aliphatic $C_1$–$C_{32}$ carboxylic acids, e.g. allyl acetate, allyl propionate, allyl butyrate, allyl valerate, allyl hexanoate, allyl 2-ethylhexanoate and allyl esters of $C_7$–$C_{32}$ fatty acids. Other monomers which may be used are vinyl esters of $C_1$–$C_{18}$ aliphatic monocarboxylic acids, for:example vinyl acetate, vinyl propionate, vinyl butyrate, vinyl-valerate, vinyl hexanoate, vinyl 2-ethylhexanoate, vinyl decanoate, vinyl pivalate, vinyl laurate, vinyl stearate or the commercially available monomers VEOVA® 5–11, or monoolefins, such as linear or branched 1-olefins, for example ethene, propene, butene, isobutene, pentene or hexene, cycloolefins, for example cydlopentene or cyclohexene, or oligoolefins prepared, for example, by metallocene catalysis and having a terminal double bond, for example oligopropene or oligohexene. (VEOVA® X is a Shell tradename for vinyl esters of α-branched aliphatic carboxylic acids having X carbon atoms, also termed Versatic® X acids).

Preferred monomers are vinylaromatic monomers, in particular styrene, α-methylstyrene, o-chlorostyrene and vinyltoluene, esters of ethylenically unsaturated $C_3$–$C_8$ mono- or $C_4$–$C_8$ dicarboxylic acids with $C_1$–$C_{12}$ alkanols or with $C_5$–$C_8$ cycloalkanols, in particular the esters of acrylic acid or methacrylic acid and the esters and half-esters of maleic acid, fumaric acid or itaconic acid with the abovementioned alkanols and cycloalkanols, and conjugated $C_4$–$C_8$ dienes, in particular butadiene.

The copolymers are generally composed of at least 60% by weight, preferably at least 70% by weight and particularly preferably at least 80% by weight, of at least one, preferably at least two, of the abovementioned preferred monomers.

The copolymer particularly preferably contains a main polymerized monomer selected from the class consisting of acrylates of $C_1$–$C_8$ alkanols, methacrylates of $C_1$–$C_8$ alkanols, vinylaromatics and $C_4$–$C_8$ diolefins.

Very particularly preferred main monomers are styrene, methyl methacrylate, n-butyl acrylate, 2-ethylhexyl acrylate, ethyl acrylate and butadiene. It is preferable for at least two of the abovementioned main monomers to have been polymerized into the copolymers.

Examples of copolymers suitable for the preparations according to the invention are:

copolymers in which the main monomers present comprise styrene and at least one ester of acrylic acid, preferably selected from the class consisting of n-butyl acrylate, 2-ethylhexyl acrylate and ethyl acrylate; or copolymers in which the main monomers present are methyl methacrylate and at least one ester of acrylic acid, preferably selected from the class consisting of n-butyl acrylate, 2-ethylhexyl acrylate and ethyl acrylate; or copolymers in which the main monomers present are styrene and at least one conjugated diene, preferably selected from the class consisting of 1,3-butadiene and isoprene; or copolymers in which the main monomers present are vinyl acetate and ethene.

The copolymers suitable for the preparation according to the inventions generally contain at least one other polymerized monomer, preferably from 1 to 5 monomers, in total amounts of from 0.1 to 30% by weight, preferably from 0.5 to 20% by weight, particularly preferably from 1 to 10% by weight, based on the total monomer content. Monomers particularly suitable as comonomers are indicated below.

Preferred comonomers are acrylamide, methacrylamide and N-$C_1$–$C_{12}$-alkyl(meth)acrylamides, in particular N,N-dimethylacrylamide and N,N-dimethylmethacrylamide, N-alkylol(meth)acrylamides, in particular N-methylolacrylamide and N-methylolmethacrylamide, alkylaminoalkyl (meth)acrylate and alkylamino(meth)acrylamides and quaternization products of these, in particular 2-(N,N-dimethylamino)ethyl methacrylate and 2-(N,N,N-trimethylammonium)ethyl methacrylate chloride, N-vinyl compounds, in particular N-vinylformamide, N-vinylpyrrolidone, N-vinylimidazole, N-vinylcarbazole and N-vinylcaprolactam, allyl esters of $C_1$–$C_{30}$ aliphatic monocarboxylic acids, in particular allyl acetate and allyl propionate, silicon-containing monomers, in particular monomers containing silyl groups, e.g. vinyltrialkoxysilanes, such as vinyltrimethoxysilane, alkylvinyldialkoxysilanes and (meth)acryloxyalkyltrialkoxysilanes, e.g. (meth)acryloxyethyltrimethoxysilane, (meth) acryloxypropyltrimethoxysilane and trimethoxysilylpropyl methacrylate, monomers containing glycidyl groups, in particular glycidyl methacrylate, glycidyl acrylate, glycidyl vinyl ether and glycidyl allyl ether, ethylenically unsaturated sulfonic acids, in particular vinylsulfonic acid, 2-acrylamido-2-methyl-propanesulfonic acid, 2-acryloxyethanesulfonic acid and 2-methacryloxyethanesulfonic acid, 3-acryloxy- and 3-methacryloxypropanesulfonic acid, vinylbenzenesulfonic acid and salts thereof, preferably the alkali metal salts or the ammonium salts, and in particular the sodium salts, monomers containing phosphorus groups, in particular ethylenically unsaturated phosphonic acids, such as vinylphosphonic acid and dimethyl vinylphosphonate, monomers containing 1,3-diketo groups, and in particular acetoxyethyl (meth)acrylate and diacetone (meth)acrylamide, monomers containing urea groups, for example ureidoethyl (meth)acrylate, acrylamidoglycolic acid and methyl methacrylamidoglycolate, α,β-ethylenically unsaturated $C_3$–$C_8$ mono- and $C_4$–$C_8$ dicarboxylic acids, in particular acrylic acid, methacrylic acid, maleic acid and itaconic acid, $C_1$–$C_8$-hydroxyalkyl esters of α,β-ethylenically unsaturated $C_3$–$C_8$ mono- and $C_4$–$C_8$ dicarboxylic acids, in particular of the abovementioned mono- and dicarboxylic acids, e.g. hydroxyethyl (meth)acrylate and 4-hydroxybutyl (meth)acrylate, alkoxylates of the $C_1$–$C_8$-hydroxyalkyl esters described above or α,β-ethylenically unsaturated $C_3$–$C_8$ mono- or $C_4$–$C_8$ dicarboxylic acids, in particular the reaction products with from 2 to 50 ml of ethylene oxide, propylene oxide, butylene oxide and/or mixtures of these, and also the direct reaction products of the abovementioned α,β-ethylenically unsaturated carboxylic acids with abovementioned alkylene oxides, where the hydroxyl groups of these alkoxylated compounds may, if desired, have been etherified with $C_1$–$C_{18}$ alkanols, e.g. methylpolyglycol (meth)acrylate.

Preferred comonomers are the $C_3$–$C_8$ mono- or $C_4$–$C_8$ dicarboxylic acids, in particular acrylic acid and methacrylic acid, acrylamide, methacrylamide, acrylonitrile, methacrylonitrile, the $C_1$–$C_8$-hydroxyalkyl esters of these carboxylic acids and the alkoxylates thereof, hydroxyethyl acrylate, hydroxyethyl methacrylate, and also methylpolyglycol acrylate, methylpolyglycol methacrylate, N-methylolacrylamide and N-methylolmethacrylamide.

In one preferred embodiment the polymerized monomers present in the copolymers are from 10 to 80% by weight, preferably from 20 to 70% by weight and particularly preferably from 25 to 65% by weight, of styrene and at least one other monomer, preferably one or two other monomers, selected from the class consisting of n-butyl acrylate, 2-ethylhexyl acrylate and ethyl acrylate, in a total amount of from 20 to 90% by weight, preferably from 45 to 75% by weight and particularly preferably from 30 to 80% by weight.

In another preferred embodiment the polymerized monomers present in the copolymers are from 30 to 85% by weight, preferably from 40 to 75% by weight and particularly preferably from 50 to 70% by weight, of styrene and from 15 to 70% by weight, preferably from 25 to 60% by weight, and particularly preferably from 30 to 50% by weight, of butadiene and, if desired, from 5 to 20% by weight of a (meth)acrylate of $C_1$–$C_8$ alkanols.

In another preferred embodiment the polymerized monomers present in the copolymers are from 10 to 80% by weight, preferably from 20 to 70% by weight and particularly preferably from 25 to 65% by weight, of at least one methacryl ate of $C_1$–$C_8$ alkanols, preferably of $C_1$–$C_4$ alkanols and particularly preferably methyl methacrylate, and at least one other monomer, preferably one or two other monomers, selected from the class consisting of acrylates of $C_1$–$C_8$ alkanols, in particular n-butyl acrylate, 2-ethylhexyl acrylate and ethyl acrylate, in a total amount from 20 to 90% by weight, preferably from 45 to 75% by weight and particularly from 30 to 80% by weight.

In another embodiment the polymerized monomers present in the copolymers are from 30 to 90% by weight, preferably from 40 to 80% by weight and particularly preferably from 50 to 75% by weight, of vinyl acetate and from 10 to 70% by weight, preferably from 20 to 60% by weight and particularly preferably from 25 to 50% by weight, of ethene and, if desired, one or two other monomers selected from the class consisting of (meth)acrylates of $C_1$–$C_8$ alkanols in a total amount of from 1 to 15% by weight.

In the embodiments described above the copolymers may also contain from 0.1 to 10% by weight, preferably from 0.5 to 7.5% by weight, of at least one other monomer, preferably selected from the group consisting of acrylonitrile, N-methylolacrylamide, acrylic acid, acrylamide and methacrylamide.

To achieve sufficient improvement of the mechanical strength of the construction materials based on loam or clay it is generally advisable to use water-dispersible copolymers with glass transition temperatures above −50° C., preferably above −40° C.

The copolymers of the preparations according to the invention preferably have a glass transition temperature $T_g$ of from −40 to +50° C., in particular from −30 to +40° C. and particularly preferably from −20 to +30° C. There is in principle no upper limit on suitable glass transition temperatures for the copolymers, but the favorable effects of the preparations according to the invention on construction materials based on loam or clay generally require that the copolymer particles present in the preparation are capable of forming a film. Preferred glass transition temperatures $T_g$ are therefore from −30 to +40° C., in particular from −20 to +30° C., since above these temperatures heat treatment of the construction materials in which the preparation according to the invention is present is generally necessary to achieve the desired effect of the preparations according to the invention on mechanical strength and water resistance. When using preparations which comprise copolymers with a $T_g$ of +30° C. or above, permanent and/or temporary film-forming auxiliaries may be added as an alternative to, or in addition to, heat treatment to facilitate or enable film formation by the copolymer particles. However, at least the temporary, i.e. volatile, film-forming auxiliaries can cause undesirable emissions and/or odor-problems during and in some cases even after drying.

It is therefore particularly preferable for the copolymers present in the preparation to be selected in such a way as to allow film formation by the copolymer particles at from −20 to +25° C.

In the case of preparations which comprise copolymer constituents with different glass transition temperatures it is generally advantageous for at least one glass transition temperature $T_g$ to be within one of the ranges given above. Preparations of this type can be obtained, for example, by mixing two or more different copolymers or by polymerization processes leading to, for example, stepwise polymerization or to polymer particles with a core-shell structure or to other types of copolymer particles whose composition is not random.

The glass transition temperature $T_g$ may be adjusted to a desired value. either by way of election of the appropriate monomers or by way of election of the quantitative proportions of the monomers used in the copolymer(s).

For the purposes of the present invention, the glass transition temperature $T_g$ is the "midpoint temperature" determined to ASTM D 3418-82 by differential scanning calorimetry (DSC) (cf. Ullmann's Encyclopedia of Industrial Chemistry, 5th Edition, Volume A 21, VCH Weinheim 1992, p. 169 and Zosel, Farbe und Lack 82 (1976), pp. 125–134, and see also DIN-53765).

In this context it is useful to estimate the glass transition temperature $T_g$ of the copolymer P. According to Fox (T. G. Fox, Bull. Am. Phys. Soc. (Ser. II) 1, 123 [1956] and Ullmanns Enzyklopädie der technischen Chemie, Weinheim (1980), pp. 17–18) a good approximation to the glass transition temperature of weakly crosslinked copolymers at high molar masses is given by $$\frac{1}{T_g} = \frac{X^1}{T_g^1} + \frac{X^2}{T_g^2} + \ldots \frac{X^n}{T_g^n}$$

where $X^1, X^2, \ldots, X^n$ are the fractions by weight of monomers $1, 2, \ldots, n$ and $T_g^1, T_g^2, \ldots, T_g^n$ are the glass transition temperatures in degrees Kelvin of polymers built up solely from one of the monomers $1, 2, \ldots, n$. These latter are known, for example, from Ullmann's Encyclopedia of Industrial Chemistry, VCH, Weinheim, Vol. A 21 (1992) p. 169 or from J. Brandrup, E. H. Immergut, Polymer Handbook $3^{rd}$ ed, J. Wiley, New York 1989.

The preparations according to the invention comprise in particular from 0.5 to 10% by weight, preferably from 0.8 to 7.5% by weight and particularly preferably from 1 to 5% by weight, of at least one alkoxylated ionic or nonionic emulsifier, based on the content of water-dispersible copolymer used. Alkoxylated emulsifiers are surface-active substances or surfactants which have at least one alkoxy unit and preferably two or more alkoxy units.

The alkoxylating agents generally used are alkylene oxides, in particular ethylene oxide, and also propylene oxide and butylene oxide. Reactions with two or more different alkoxylating agents can also give mixed-alkoxylation compounds, and the addition reactions with the alkoxylating agents may give a random distribution or give blocks, depending on the process selected. For the purposes of the present invention, alkoxylated emulsifiers are either nonionic alkoxylated emulsifiers, which contain a lipophilic moiety and one or more alkoxy units, or are ionic ethoxylated emulsifiers, which contain a lipophilic moiety, one or more alkoxy units and at least one ionic group. Preferred lipophilic moieties are hydrocarbon:radicals having at least 6 carbon atoms, preferably not more than 60 carbon atoms, and particularly preferably from 7 to 30 carbon atoms.

Examples of suitable lipophilic constituents of the emulsifiers are aliphatic and/or aliphatic and aromatic alcohols, amides, amines or carboxylic acids, in particular fatty acids, fatty alcohols, oxo-alcohols, their derivative amines, amides and salts, phenols, alkylphenols, hydroxy- or amindnaphthalenes and dicarboxylic acids, in particular succinic acid, modified, and/or substituted if desired, with ionic groups. Suitable alkoxylated emulsifiers are obtained, for example, by reacting the abovementioned compounds with alkoxylating agents, preferably with ethylene oxide or propylene oxide. Examples of suitable ionic groups are sulfate, sulfonate, carboxylate, alcoholate and ammonium. Preferred ionic groups are anionic groups, in particular sulfate, sulfonate, carboxylate and-alcoholate.

The emulsifiers preferably have from 2 to 200 alkoxy units.

The emulsifier is preferably an alcohol alkoxylated with from 3 to 150 mol, preferably from 4 to 100 mol and particularly preferably from 5 to 80 mol, of ethylene oxide and having at least 6 carbon atoms, preferably at least 8 carbon atoms and particularly preferably from 10 to 25 carbon atoms, and, if desired, having one or more ionic groups selected from the class consisting of sulfate, sulfonate, carboxylate, phosphate and phosphonate, preferably sulfate or sulfonate.

Examples of suitable nonionic emulsifiers are those selected from the class consisting of $C_6$–$C_{18}$-alkylphenol polyethoxylates or -propokylates, $C_8$–$C_{32}$-alkyl- and -alkenyl ethoxylates, $C_8$–$C_{32}$-alkyl- and -alkenyl propoxylates, polyalkylene oxide adducts, such as ethylene oxide-propylene oxide block copolymers, fatty acid alkylolamide ethoxylates, ethoxylated fatty acids, fatty amines, fatty acid amides and alkanesulfonamides which have from 3 to 150 alkoxy units, preferably from 4 to 100 alkoxy units and with preference from 5 to 80 alkoxy units.

Suitable anionic emulsifiers are preferably selected from the class consisting of the sulfonates and sulfates of $C_6$–$C_{18}$-alkylphenol polyethoxylates, the sulfonates and sulfates of $C_8$–$C_{32}$-alkyl or alkenyl polyethoxylates, the sulfonates of $C_8$–$C_{32}$-alkylglyceryl polyethoxylates, ethbxylated sulfosuccinic half- and diesters, phosphates of $C_8$–$C_{32}$-alkyl, alkenyl or dialkyl polyethoxylates, ethoxylated mono- and dialkylbiphenyl ethers sulfonated one or more times on their rings, ethoxylated $\alpha$-sulfo fatty acid esters, ethoxylated fatty acid monoglycerides, sulfates of fatty acid alkanolamines, ethoxylated fatty acid esters, ethoxylated fatty acid sarcosides, ethoxylated fatty acid glycolates, ethoxylated fatty acid lactates, ethoxylated fatty acid taurides and ethoxylated fatty acid isethionates which have from 4 to 150 alkoxy units, preferably from 5 to 100 alkoxy units and particularly preferably from 6 to 80 alkoxy units.

Particularly preferred emulsifiers are $C_9$–$C_{18}$-alkyl and alkenyl ethoxylates and $C_9$–$C_{18}$-alkyl and alkenyl propoxylates, in particular ethoxylates, having from 2 to 50 alkoxy units, preferably from 5 to 35 alkoxy units, $C_6$–$C_{16}$-alkylphenol ethoxylates and $C_6$–$C_{16}$-alkylphenol propoxylates, in particular the ethoxylates, having from 5 to 50 alkoxy units, preferably from 10 to 30 alkoxy units, polyalkylene oxide copolymers, in particular ethylene oxide-propylene oxide copolymers, e.g. in the form of amphiphilic 2-, 3- or multiblock copolymers with a weight-average molecular weight of from 200 to 20,000, preferably from 1000 to 10,000 and an ethylene oxide/propylene oxide ratio of from 10:1 to 1:2. Other particularly preferred emulsifiers are ionic emulsifiers, such as sulfates and sulfonates of $C_9$–$C_{18}$-alkyl polyethoxylates or of alkenyl polyethoxylates having in each case from 1 to 50 alkoxy units, preferably from 2 to 35 alkoxy units, and sulfates and sulfonates of $C_6$–$C_{16}$-alkylphenol polyethoxylates, in particular sulfonates and sulfates of octylphenol polyethoxylates or of nonylphenol polyethoxylates, preferably those having from 1 to 50 alkoxy units, particularly preferably from 2 to 35 alkoxy units.

The preparations according to the invention may comprise one or more ethoxylated emulsifiers.

Preferred embodiments of the present invention use a mixture of a nonionic alkoxylated emulsifier with an ionic, preferably anionic, alkoxylated emulsifier, for example a mixture made from an ethoxylated fatty alcohol with a sodium sulfate of an alkyl polyethoxylate or a mixture made from a sulfate of nonylphenol polyethoxylate with an octylphenol polyethoxylate, or a mixture of a sulfate of a nonylphenol polyethoxylate with an ethoxylated fatty alcohol.

The preparations according to the invention may, if desired, also comprise nonalkoxylated ionic or nonionic emulsifiers, but at least 50% by weight, preferably at least 75% by weight, of the emulsifiers used are generally alkoxylated ionic and/or nonionic emulsifiers. The preparations according to the invention are preferably essentially free from nonalkoxylated emulsifiers.

The preparations according to the invention may moreover comprise conventional protective colloids. It is preferable for no protective colloids to have been used in preparing the copolymers. If the preparations comprise protective colloids these are preferably not added until after the copolymers have been prepared.

The abovementioned surface-active substances, in particular the emulsifiers, may be added to some extent or entirely during the preparation of the copolymers, or to some extent or entirely after the preparation of the copolymers, or to some extent or entirely during their use to prepare the novel construction materials. In preparing the copolymers to be used according to the invention by free-radical emulsion polymerization in aqueous media it has proven advantageous to use at least 25% by weight, preferably at least 50% by weight, and particularly preferably at least 75% by weight, of the total amount of the emulsifiers during the preparation of the copolymers.

If the copolymers are not obtained in an aqueous medium it can be advantageous to add at least 25% by weight, preferably at least 50% by weight and in particular at least 75% by weight, of the emulsifier after the preparation of the copolymers.

The preparations used according to the invention may be used in a solid form, e.g. as a powder or pellets, in semisolid form, e.g. as a paste, or in liquid form, e.g. as a dispersion. The solid and liquid forms are preferred, in particular the dispersion. If the copolymers to be used according to the invention are obtained by free-radical polymerization in an aqueous medium they may be used for the preparations according to the invention directly, if desired after adjusting the solids content, or after drying, preferably after spray drying. If the preparations according to the invention are used in the form of an aqueous dispersion the solids content of the preparation, i.e. the proportion of nonvolatile constituents, is generally from 20 to 80% by weight. The preparations according to the invention are preferably used in the form of an aqueous dispersion of strength, based on solids content, from 30 to 70% by weight, in particular from 35 to 60% by weight and particularly preferably from 40 to 55% by weight.

When preparations are used as an aqueous dispersion the viscosity is generally from 10 to 2500 mPas, preferably from 100 to 1500 mPas, when measured on a 40% strength by weight dispersion in a rotary viscometer, to DIN 53019 at 23° C. and with a shear rate of 250 $S^{-1}$. The aqueous dispersion medium for the preparations according to the invention may comprise organic solvents, preferably organic solvents miscible with water, e.g. alcohols, diols or polyols. The content of organic solvents is preferably below 10% by weight, based on the total weight of the preparation, and it is particularly preferable for the preparations to be essentially free from organic solvents.

The preparations may comprise customary auxiliaries. The total amount of auxiliaries used is generally from 0.1 to 30% by weight. Examples of conventional auxiliaries are wetting agents, fungicides, antifoams, e.g. the commercially available antifoams from BASF (Ludwigshafen), Münzig (Heilbronn) or Wacker (Munich), thickeners, antifreezes, flow promoters, plasticizers and film-forming agents.

Examples of suitable film-forming auxiliaries are ethylene glycol, propylene glycol, butylene glycol, hexylene glycol, diethylene glycol, dipropylene glycol, dibutylene glycol, monoethers of these with $C_1$–$C_4$ alkanols, e.g. diethylene glycol monoethyl ether, diethylene glycol monobutyl ether, propylene glycol monophenyl ether, propylene glycol monopropyl ether, propylene glycol monobutyl ether, dipropylene glycol monopropyl ether and dipropylene glycol monobutyl ether, their ether acetates, such as diethylene glycol monoethyl ether acetate and diethylene glycol monobutyl ether acetate, propylene glycol monopropyl ether acetate, propylene glycol monobutyl ether acetate and dipropylene glycol n-butyl ether acetate, and also alkyl esters of aliphatic mono- or dicarboxylic acids, e.g. Texanol® from Eastman Kodak, or industrial mixtures of these, e.g. Lusolvan FBH from BASF AG (di-n-butyl ester mixtures from succinic, glutaric and adipic acids). The plasticizers may be any of the usual plasticizers suitable for dispersions, for example (oligo)propylene glycol alkylphenyl ethers, e.g. those commercially available as Plastilit® 3060 from BASF AG.

The preparations according to the invention may also comprise a plasticizer for mineral binders. The plasticizers for mineral binders are generally additives which modify the properties of binders, in particular usage consistency and/or setting properties. These plasticizers for mineral binders are generally water-soluble macromolecular substances. They are present in amounts which give the amounts stated below in the resultant construction materials.

Surprisingly, it has been found that the presence of a plasticizer can still further improve the good ease of use and/or the mechanical properties, in particular shrinkage on drying, which the construction materials based on loam or clay are observed to have in the presence of the preparations according to the invention.

Suitable plasticizers are preferably those based on naphthalenesulfonic acid-formaldehyde condensates, or melamine-formaldehyde polycondensates and/or ligninsulfonates, e.g. as described in EP-A-402 319, or else those based on homo- and copolymers of carboxylic acids and dicarboxylic acids with styrene, e.g. as described in EP-A-306 449 and U.S. Pat. No. 3,952,805, or isobutene or diisobutene, as described in DE-A-37 16 974, EP-A-338 293, DE-A-39 25 306, U.S. Pat. No. 4,586,960, U.S. Pat. No. 4,042,407 and U.S. Pat. No. 4,906,298.

Other suitable plasticizers are those based on copolymers made from unsaturated carboxylic acids with hydroxyalkyl esters of unsaturated carboxylic acids, e.g., as described in EP 97 613, or based on polymerized carboxylic acid monomers and polyalkylene oxide esters of acrylic acid or of methacrylic acid, e.g. as described in DE-A-44 20 444, or based on ethylenically unsaturated polyoxyalkylene ethers, on alkenyl ethers having more than one unsaturation and maleic anhydride, for example as described in EP 619 277, or based on copolymers of maleic acid derivatives with vinyl monomers, for example as described in DE-A-43 04 109 and EP-A-610 699.

The entire scope of the abovementioned publications is incorporated herein by way of reference.

Plasticizers of this type are available commercially, for example from ADDIMENT (Heidelberg), SKW (Troisdorf), BASF (Ludwigshafen), in particular Sokalan grades, and DYCKERHOFF (Wiesbaden).

Preference is given to plasticizers based on naphthalenesulfonic acid condensates, or on copolymers of carboxylic acid monomers with polyalkylene oxide esters of acrylic acid or of methacrylic acid.

The use of the preparations according to the invention gives better properties in a variety of construction materials based on mineral binders, in particular increased mechanical strength, water resistance and/or ease of use. The properties of the preparations according to the invention have a particularly advantageous effect in the case of building materials based on loam or clay, in particular unburnt building materials based on loam or clay.

Clays are plastic sediments associated with soils described as "cohesive". Their mineral makeup generally means that when they absorb water they swell and/or become capable of plastic deformation, and their shape is essentially retained after drying. Clays are mostly weathering products derived from feldspar and from other minerals in the original rock and are generally composed predominantly of lamellar aluminosilicates. The most widespread clay minerals are kaolinite, montmorillonite and illite. Clays also frequently comprise iron oxide hydrates and other iron compounds, and also manganese compounds, calcareous compounds and magnesium compounds. There is no unitary chemical composition which can be given for clay.

Loam is a clay mostly given a yellow or brownish color by very finely divided limonite (brown iron ore) and has varying concentrations of admixed quartz grains, quartz dust, lime, mica or other inorganic or organic impurities. Depending on their particle size, these admixed materials are also termed silt (with diameter typically from 0.002 to 0.06 mm), sand (typically from 0.06 to 2 mm) or gravel (typically from 2 to 6.0 mm). Loam is therefore a mixture made from clay, silt and sand and may have admixtures of larger rock particles and also of organic constituents. In loam the clay acts as a binder bonding together the other constituents, so that silt, sand and gravel function as filling materials. Clay particles, in contrast, typically have a diameter below 0.002 mm. The proportions by weight of the clay, silt and sand components may vary greatly, so that for loam it is again impossible to give a unitary chemical composition.

The invention further provides construction materials based on loam and clay and comprising, based on the mineral content, from 1 to 30% by weight of a polysulfide-free composition as defined above, where the % by weight figures are based on the preparation and calculated in terms of solid. The construction materials preferably comprise from 2.0 to 25% by weight, particularly preferably from 2.5 to 10% by weight, of the preparation according to the invention.

The novel construction materials may in addition comprise one or more plasticizers, in particular plasticizers for mineral binders. Suitable plasticizers are described above. The novel building materials then preferably comprise, based on the mineral content, from 0.1 to 10% by weight, in particular from 0.5 to 5% by weight, particularly preferably from 0.5 to 2% by weight, of a plasticizer for mineral binders (calculated in terms of solid).

The novel construction materials may be used in a variety of decorative and construction applications, in particular in the construction of buildings and walls.

The novel construction materials may comprise, based on mineral content and calculated in terms of solid, from 5 to 250% by weight, preferably from 5 to 100% by weight, of porous substances, such as straw, reeds, cork, pumice, expanded clay, perlites, wood chips or savings or sawdust. Adding porous substances of this type or filler materials in general can optimize the construction materials for a particular application, for example if particular requirements are placed on the thermal insulation properties and/or the weight or density of the construction materials.

The novel construction materials are suitable for a wide variety of applications, preferably for use in rammed-earth construction, for filling the spaces between the timbers in half-timbered or timber-frame buildings, as a render, as a mortar, for producing building blocks or for sealing ground, either above or below its surface, for example in renovation work, as a protection measure in civil engineering, e.g. at landfill sites, pipelines or tank stores, and in particular in the construction of dams and dykes.

The preparations according to the invention for the novel construction materials may advantageously be used for the construction of dams and dykes. Dams and dykes are generally composed of a sand core surrounded by an outer layer of loam or clay. These are intended firstly to give the earth embankment mechanical strength and secondly, through the comparatively high impermeability of the layers of clay or loam, to prevent excessive penetration of water into the interior. In addition, the outer layer prevents erosion of the material by wind, water or other agents (see also W. Striegeler "Dammbau in Theorie und Praxis"; Verlag für Bauwesen, 2nd edn.; 1998). The mechanical strength and the impermeability and/or the protection from erosion may be improved by using the construction materials or preparations according to the invention.

Addition of fillers can give a material termed light loam, as in DIN 18951.

The present invention also provides a process for treating construction materials based on loam or clay, where a preparation as defined above is added to the construction materials. It is preferable to add from 1 to 30% by weight of the preparation, based on the mineral content. The statements made above concerning the use according to the invention apply again to the novel process.

The process described above is preferably suitable for improving mechanical strength, stability, water resistance and ease of use.

When using construction materials based on loam or clay it is generally necessary to prepare slurries of loam or clay. This is generally done by adding water. The desired consistency is mostly achieved by adjusting the amount of liquid.

The amount of liquid required for a suitable consistency is mostly reduced significantly in the presence of the preparations according to the invention. When compared with loam or clay which comprises no additives, and to an even more significant extent when compared with conventional additives based on polymer dispersions and/or on polymer emulsions or on dispersible polymers, the slurries of loam or clay are significantly easier to use in the presence of the preparations according to the invention. This improved ease of use is apparent particularly in the ease and rapidity of obtaining compositions comprising loam or clay which are homogeneous and have a suitable-viscosity, without any separating-out or "bleed-out" of the polymer component in cases where additives based on dispersions, emulsions, or dispersible copolymers are present.

The water resistance of the hardened construction materials based on loam or clay and comprising the preparations according to the invention is significantly better than that of construction materials based on loam or clay which comprise no additives, and also when compared with conventional dispersions or emulsions.

Another advantage of the preparations according to the invention is that they reduce the shrinkage during drying of the construction materials based on loam or clay, both in comparison with untreated construction materials based on loam or clay and in comparison with conventional additives, some of which even cause an increase in shrinkage. The mechanical strength of the novel construction materials based on loam or clay after drying, is significantly higher than that of untreated materials based on loam or clay and is at least comparable to that obtained using conventional additives based on dispersions, emulsions or dispersible polymers.

The examples below display the invention without limiting the same.

EXAMPLES

The preparations according to the invention used in the inventive examples, and also the preparations used in the comparative examples, were obtained by free-radical polymerization in an aqueous medium. Where inventive examples used a plasticizer, this was added during preparation of the novel construction materials.

The solids content (i.e. the nonvolatile fractions) was determined from the loss in weight of a sample (about 1 g) as a result of drying for 2 hours in a circulating-air drying cabinet at 120° C. The viscosity of the preparations was determined with the aid of a rotary viscometer (Rheomat) from Paar Physica at a shear rate of $250^{-1}$ according to DIN 53019 at 23° C. The glass transition temperatures $T_g$ were determined with the aid of a DSC 820 differential calorimeter from Mettler Toledo with a 25 linear heating rate of 5° C./min.

I. Preparing the Preparations According to the Invention

Preparation 1

450 g of deionized water were placed in a 4 l glass vessel with anchor stirrer (120 rpm). With the internal temperature at 85° C., 5% by weight of the total amount of a feed 1 and 10% by weight of the total amount of a feed 2 were added. Polymerization of the reaction mixture was begun at 85° C. for 10 min. Then at 85° C. within a period of 4 h the residual amount of feed 1, and in 4.5 h the residual amount of feed 2, were added continuously at separate locations. After a further 30 min at this temperature the reaction mixture was cooled and neutralized with a 25% strength by weight aqueous calcium hydroxide solution. The resultant preparation comprised 50.9% by weight of nonvolatile fractions and had a pH of 7.1. Its viscosity was 432 mPas. The copolymer present in the preparation has a glass transition temperature $T_g$ of −6° C.

| Feed 1: | |
| --- | --- |
| 539 g | of deionized water |
| 64 g | of a 35% strength by weight aqueous solution of a nonylphenol polyethoxylate with a degree of ethoxylation of about 25 |
| 75 g | of a 20% strength by weight aqueous solution of a octylphenol polyethoxylate with a degree of ethoxylation of about 25 |
| 780 g | of styrene |
| 660 g | of 2-ethylhexyl acrylate |
| 38 g | of acrylic acid |
| 15 g | of acrylamide |
| 8 g | of methacrylamide |
| Feed 2: | |
| 95 g | of deionized water |
| 6 g | of sodium peroxodisulfate |

Preparation 2

1200 g of deionized water were placed in a 12 l pressure autoclave with anchor stirrer (120 rpm). With the internal temperature at 90° C., 5% of the total amount of a feed 1 and 5% by weight of the total amount of a feed 2, and also 2% by weight of the total amount of a feed 3 were added. Polymerization of the reaction mixture was begun at 90° C. for 10 min. Then at 90° C. within a period of 4 h the residual amount of feeds 1 and 2, and within a period of 4.5 h the residual amount of feed 3, were added continuously at separate locations After a further 60 min at this temperature the reaction mixture was cooled and neutralized with a 25% strength by weight aqueous calcium hydroxide solution. The resultant preparation comprises 50.0% by weight of non-volatile fractions and has a pH of 7.5. Its viscosity was 219 mPas. The copolymer present in the preparation has a glass transition temperature $T_g$ of +17° C.

| Feed 1: | |
|---|---|
| 2550 g | of deionized water |
| 250 g | of a 20% strength by weight aqueous solution of an ethoxylated $C_{13}$ fatty alcohol with a degree of ethoxylation of about 8 |
| 268 g | of a 28% strength by weight aqueous solution of the sulfate of a sodium alkyl polyethoxylate with a degree of ethoxylation of about 3 (Texapon NSO from Henkel) |
| 3150 g | of styrene |
| 125 g | of acrylonitrile |
| 250 g | of a 48% strength by weight aqueous solution of N-methylolacrylamide |
| Feed 2: | |
| 1600 g | of butadiene |
| Feed 3: | |
| 720 g | of deionized water |
| 50 g | of sodium peroxodisulfate |

III. Preparing the Comparative Preparations

Comparative Preparation C1

The monomer composition and method of preparing this preparation correspond to those of preparation 1. The feed 1 used was

| Feed C1: | |
|---|---|
| 430 g | of deionized water |
| 250 g | of a 15% strength by weight aqueous solution of sodium lauryl sulfate |
| 780 g | of styrene |
| 660 g | of 2-ethylhexyl acrylate |
| 38 g | of acrylic acid |
| 15 g | of acrylamide |
| 8 g | of methacrylamide |

No ethoxylated emulsifier is present in the preparation. The resultant preparation comprises 49.2% by weight of nonvolatile fractions and has a pH of 7.2. Its viscosity is 375 mPas. The copolymer present has a glass transition temperature of −3° C.

Comparative Preparation C2

The monomer composition and method of preparing this comparative preparation correspond to those for preparation 2 according to the invention, except that the feed 1 used was

| Feed C2: | |
|---|---|
| 2350 g | of deionized water |
| 835 g | of a 15% strength by weight aqueous solution of sodium lauryl sulfate |
| 3150 g | of styrene |
| 125 g | of acrylonitrile |
| 250 g | of a 48% strength by weight aqueous solution of N-methylolacrylamide |

No ethoxylated emulsifier is present in this preparation. The resultant preparation comprises 49.2% by weight of nonvolatile fractions and has a pH of 6.8. Its viscosity is 189 mPas. The copolymer present has a glass transition temperature of +19° C.

Comparative Preparation C3

The comparative preparation C3 used was a commercially available ethylene-vinyl acetate copolymer dispersion from Wacker. This dispersion, which is available with the product name VINNAPAS EP 116, is stated by the manufacturer to have a glass transition temperature of +1° C., corresponding to an approximate monomer composition of 85% by weight of vinyl acetate and 15% by weight of ethylene. This product therefore represents the dispersions or emulsions described in J-56050156. A polyvinyl alcohol is present as stabilizer for the copolymer in the preparation, as is usual for ethylene-vinyl acetate copolymers. The solids content of this preparation is 50% by weight and its pH is 4.5.

IV. Preparing the Samples of Loam or Clay

To prepare the samples of loam or clay the following mineral binders were used. Clay: kaolinitic clay, Kaolin-Quarzwerk Schnaitenbach (Bavaria, Germany) Loam: Green bricks ziegelei Frankenberg (Hessen, Germany) and pulverulent loam from Eider (Rheinland-Pfalz, Germany)

Chemical analysis and X-ray diffractometry determined the mineral composition of the clay from Schnaitenbach at about 96% by weight of kaolinite, 3% by weight of ortho-clays and 1% by weight of quartz and that of the loam from Frankenberg at about 75% by weight of quartz, 15% by weight of kaolinite, 9% by weight of illite/muscovite and about 1% by weight of orthoclays. The aggregate used was standard sand.

Taking DIN 1164 as the basis, the loams, clays and aggregates (standard sand) described above were used, where appropriate with a preparation according to the invention or with a comparative preparation, to produce test blocks. The weight ratio of loam or clay to aggregate is 1:3 in all of the samples. Where an additional plasticizer was used in samples the amount of this used was in each case 2% by weight, based on the amount of loam or clay. The products used here were Glenium 51, a naphthalenesulfonic acid condensate from SKW and Sokalan HP 80, a sodium salt of a modified polymethacrylic acid from BASF. The composition of the individual samples is listed in Table 2. The samples were produced by mechanical mixing of the loam or clay with the relevant aqueous preparation. The amount of mixing water added to the aqueous slurries here was sufficient to give a spread of 15±0.5 cm to DIN 1855 Part 2. The resultant material was charged to a mold corresponding to the dimensions given above, compacted and then dried to constant weight under standard conditions of temperature and humidity to DIN 50014-23/50. This process took about 7 days. The criteria investigated were the ease of use of the slurries prepared as described above, the shrinkage of the samples during drying and the flexural, tensile and compressive strengths of the samples after setting, and also their water resistance. Each test was carried out as follows:

Ease of use: The test studied how the aqueous slurries of clay or loam behaved during preparation and use, whether a homogeneous material of suitable viscosity can be prepared Table 1 gives the results of the tests.

| Evaluation scale: | 1 | very good |
|---|---|---|
| | 2 | good |
| | 3 | satisfactory |
| | 4 | moderate |
| | 5 | poor/low |
| | 6 | very poor/very low |

TABLE 1

Properties of the inventive and noninventive construction materials based on loam or clay

| Example | Preparation | Plasticizer[1] [% by wt.] | Amount of preparation [% by wt.][4] | Ease of use [grade] | Shrinkage [mm/m] | Flexural tensile strength [N/mm$^2$] | Compressive strength [N/mm$^2$] | Water resistance [grade] |
|---|---|---|---|---|---|---|---|---|
| E1 | 1 | — | 3.75 | 1 | 12 | 6.5 | 16.2 | 1 |
| E2 | 2 | — | 3.75 | 1 | 7 | 5.3 | 12.0 | 1 |
| CE1 | V1 | — | 3.75 | 4 | 16 | 5.4 | 8.5 | 3 |
| CE2 | V2 | — | 3.75 | 4 | 9 | 4.9 | 11.1 | 2 |
| CE3 | V3 | — | 3.75 | 3 | 24 | 7.0 | 16.0 | 2 |
| CE4 | — | — | — | 2 | 14 | 0.3 | 0.9 | 6 |
| E3 | 1 | 0.5[2] | 3.75 | 1 | 9 | 7.0 | 16.0 | 1 |
| E4 | 2 | 0.5[3] | 3.75 | 1 | 5 | 5.8 | 13.1 | 1 |

1) amount of plasticizer, based on the mineral content,
2) Sokalan HP 80. BASF
3) Glenium 51. SKW
4) based on the mineral content and whether "bleed-out" of the polymer component, i.e. enrichment of the polymer component in the aqueous. constituents, occurs. A high requirement for mixing water was also evaluated as disadvantageous for ease of use, as were high adhesion between the material and handling equipment, such as stirrers and mixing vessel. Ease of use was evaluated in grades from "very good" to "very poor" as in the table below.

Shrinkage: Shrinkage is determined as a change in length of the sample as hardening proceeds. Based on DIN 52450, it is the ratio of the sample length, as measured after removal from the mold, to the internal length of the mold. Shrinkage is given in mm/m.

Flexural tensile strength: Flexural tensile strength was measured on an RK Toni Technik TONICOMP III test press. The samples used for the test were prepared as described above. The rate of load increase was 20 N/s. The flexural tensile strength is given in N/mm$^2$.

Compressive strength: The compressive strength was measured to DIN EN 196-1 on a test press as described above. Once again the samples were used here, and the rate of load increase was 20 N/s.

Water resistance: The water resistance of the sample was determined by storing the sample in water for 6 days at 20° C. The samples were completely covered by water for the entire time, and the height of the water column above the sample was, 2 cm. During and after the storage in water the sample was checked for softening, cracking or break-up. The water resistance was evaluated in grades from "very good" to "very low" as in the table below.

From the results it is clear that the loam or clay sample without added polymer (CE4) has good ease of use but high shrinkage on drying and generally low strength. When this sample is stored in water it breaks up completely during the 7 days. The Inventive Examples E1 and E2 show very good ease of use in the presence of the preparations according to the invention. The samples obtained in this way have low shrinkage, high mechanical strength and very good water resistance, both in comparison with the sample without additive (CE4) and also in comparison with samples with comparative preparations (CE1, CE2 and CE3). The samples with comparative preparations C1 and C2 are found to have only moderate ease of use, increased shrinkage and also significantly lower water resistance.

In the case of the ethylene-vinyl acetate comparative preparation in Comparative Example CE3 the ease of use is poorer and the shrinkage is significantly increased, even in comparison with the samples without polymer additive. The samples in which the preparations according to the invention were supplemented by plasticizer (E4 and E4) show that the shrinkage of the novel construction materials, which is in any case low, can be improved still further by way of this additive and the mechanical strength can be still further increased without impairing the other properties. No detectable odor occurs in any of the samples E1 to E4 produced, either during their preparation or testing or thereafter.

We claim:
1. A method for treating a construction material based on loam or clay, the method comprising the addition of a polysulfide-free preparation to the construction material, said polysulfide-free preparation comprising, based on solids content, from 40 to 99.5% by weight of at least one water-dispersible copolymer which comprises

- 90 to 99% by weight of at least one monomer selected from vinylaromatic monomers, esters of ethylenically unsaturated $C_3$–$C_8$ mono- or $C_4$–$C_8$ dicarboxylic acids with $C_1$–$C_{12}$ alkanols or with $C_5$–$C_8$ cycloalkanols, and conjugated $C_4$–$C_8$ dienes, and
- 1 to 10% by weight of at least one comonomer, and from 0.5 to 10% by weight of at least one alkoxylated ionic or nonionic emulsifier.

2. The method as claimed in claim 1, wherein the emulsifier has from 2 to 200 alkoxy units.

3. The method as claimed in claim 1, wherein the emulsifier is an alcohol alkoxylated with from 3 to 150 ml of ethylene oxide and having at least 6 carbon atoms and, if desired, has one or more ionic groups, selected from the class consisting of sulfonate, sulfate and carboxylate.

4. The method as claimed in claim 1, wherein the copolymer contains at least one main polymerized monomer selected from the class consisting of acrylates of $C_1$–$C_8$ alkanols, methacrylates of $C_1$–$C_8$ alkanols, vinylaromatics and $C_4$–$C_8$ diolefins.

5. The method as claimed in claim 1, wherein the preparation further comprises a plasticizer for mineral binders.

6. The method as claimed in claim 1, wherein the amount used of the preparation, calculated as solid, is from 1 to 30% by weight, based on the mineral content of the construction materials.

7. A construction material based on loam or clay comprising, based on the mineral content, from 1 to 30% by weight of a polysulfide-free preparation as defined in claim 1, calculated as solid.

8. A construction material as claimed in claim 7, comprising, based on the mineral content, from 0.1 to 10% by weight of a plasticizer for mineral binders.

9. A construction material as claimed in claim 7, comprising, based on the mineral content, from 5 to 250% by weight of porous substances, comprising straw, reeds, cork, pumice, expanded clay, perlites, wood chips, shavings or sawdust.

10. A construction material as claimed in claim 8, comprising, based on the mineral content, from 5 to 250% by weight of porous substances, comprising straw, reeds, cork, pumice, expanded clay, perlites, wood chips, shavings or sawdust.

* * * * *